US009077817B2

(12) United States Patent
Lorello

(10) Patent No.: US 9,077,817 B2
(45) Date of Patent: *Jul. 7, 2015

(54) VOICE OVER INTERNET PROTOCOL (VOIP) E911 METRO STREET ADDRESS GUIDE (MSAG) VALIDATION

(71) Applicant: TeleCommunication Systems, Inc., Annapolis, MD (US)

(72) Inventor: Timothy J. Lorello, Gambrills, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/539,247

(22) Filed: Nov. 12, 2014

(65) Prior Publication Data

US 2015/0071417 A1    Mar. 12, 2015

Related U.S. Application Data

(63) Continuation of application No. 13/067,020, filed on May 3, 2011, now Pat. No. 8,913,983, which is a continuation of application No. 11/442,254, filed on May 30, 2006, now Pat. No. 7,945,026.

(60) Provisional application No. 60/685,075, filed on May 27, 2005.

(51) Int. Cl.
*H04W 4/22* (2009.01)
*H04M 11/04* (2006.01)
*H04M 7/00* (2006.01)

(52) U.S. Cl.
CPC .............. *H04M 11/04* (2013.01); *H04M 7/006* (2013.01); *H04M 2242/04* (2013.01)

(58) Field of Classification Search
CPC ..... H04L 65/1069; H04M 11/04; H04W 4/22
USPC ........ 455/404.1, 404.2, 456, 456.1, 457, 439, 455/414.1, 67.1, 414.2, 418–419; 370/356, 370/352, 466, 329; 379/37–38, 45
See application file for complete search history.

(56) References Cited

U.S. PATENT DOCUMENTS

| 1,103,073 A | 7/1914 | O'Connell |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll |

(Continued)

OTHER PUBLICATIONS

The Power of Mobile Unified Messaging: Siemans and Comverse to Demonstrate WAP-Based Messaging Applications on Live GPRS System, Comverse, Feb. 2000.

(Continued)

*Primary Examiner* — Babar Sarwar
(74) *Attorney, Agent, or Firm* — William H. Bollman

(57) ABSTRACT

An overlay list of MSAG-valid addresses is created for use in lieu of (or in addition to) the lat/lon or postal address which otherwise would go with an E911 VoIP 911 call. This overlays the nation with a series of MSAG-addressed polygons, with center points identified in those polygons, and MSAG-valid addresses provided to the PSAPs for those centers, preferably along with the original latitude/longitude coordinates.

16 Claims, 6 Drawing Sheets

(56) References Cited

U.S. PATENT DOCUMENTS

| | | |
|---|---|---|
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,144,283 A | 9/1992 | Arens |
| 5,161,180 A | 11/1992 | Chavous |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,289,527 A | 2/1994 | Tiedemann, Jr. |
| 5,293,642 A | 3/1994 | Lo |
| 5,299,132 A | 3/1994 | Wortham |
| 5,325,302 A | 6/1994 | Izidon |
| 5,334,974 A | 8/1994 | Simms |
| 5,343,493 A | 8/1994 | Karimullah |
| 5,345,227 A | 9/1994 | Fascenda |
| 5,347,568 A | 9/1994 | Moody |
| 5,349,696 A | 9/1994 | Matai |
| 5,351,235 A | 9/1994 | Lahtinen |
| 5,353,328 A | 10/1994 | Jokimies |
| 5,361,212 A | 11/1994 | Class |
| 5,363,425 A | 11/1994 | Mufti |
| 5,374,936 A | 12/1994 | Feng |
| 5,379,031 A | 1/1995 | Mondrosch |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckert |
| 5,394,158 A | 2/1995 | Chia |
| 5,396,227 A | 3/1995 | Carroll |
| 5,396,558 A | 3/1995 | Ishiguro |
| 5,398,190 A | 3/1995 | Wortham |
| 5,406,614 A | 4/1995 | Hara |
| 5,408,513 A | 4/1995 | Busch |
| 5,408,519 A | 4/1995 | Pierce |
| 5,408,682 A | 4/1995 | Ranner |
| 5,412,726 A | 5/1995 | Nevoux |
| 5,418,537 A | 5/1995 | Bird |
| 5,423,076 A | 6/1995 | Westergren |
| 5,432,841 A | 7/1995 | Rimer |
| 5,434,789 A | 7/1995 | Fraker |
| 5,438,615 A | 8/1995 | Moen |
| 5,440,621 A | 8/1995 | Castro |
| 5,454,024 A | 9/1995 | Lebowitz |
| 5,457,737 A | 10/1995 | Wen |
| 5,461,390 A | 10/1995 | Hoshen |
| 5,465,289 A | 11/1995 | Kennedy, Jr. |
| 5,465,401 A | 11/1995 | Thompson |
| 5,469,497 A | 11/1995 | Pierce |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,485,505 A | 1/1996 | Norman |
| 5,488,563 A | 1/1996 | Chazelle |
| 5,494,091 A | 2/1996 | Freeman |
| 5,497,149 A | 3/1996 | Fast |
| 5,502,761 A | 3/1996 | Duncan |
| 5,506,893 A | 4/1996 | Buscher |
| 5,508,931 A | 4/1996 | Snider |
| 5,513,243 A | 4/1996 | Kage |
| 5,515,287 A | 5/1996 | Hakoyama |
| 5,519,403 A | 5/1996 | Bickley |
| 5,532,690 A | 7/1996 | Hertel |
| 5,535,434 A | 7/1996 | Siddoway |
| 5,539,398 A | 7/1996 | Hall |
| 5,543,776 A | 8/1996 | L'Esperance |
| 5,552,772 A | 9/1996 | Janky |
| 5,555,286 A | 9/1996 | Tendler |
| 5,555,446 A | 9/1996 | Jasinski |
| 5,568,119 A | 10/1996 | Schipper |
| 5,574,648 A | 11/1996 | Pilley |
| 5,579,372 A | 11/1996 | Angstrom |
| 5,588,009 A | 12/1996 | Will |
| 5,590,417 A | 12/1996 | Rydbeck |
| 5,592,535 A | 1/1997 | Klotz |
| 5,604,486 A | 2/1997 | Lauro |
| 5,606,313 A | 2/1997 | Allen |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,628,600 A | 5/1997 | Pasquini |
| 5,633,912 A | 5/1997 | Tsoi |
| 5,682,600 A | 10/1997 | Salin |
| 5,687,216 A | 11/1997 | Svensson |
| 5,724,667 A | 3/1998 | Furuno |
| 5,740,534 A | 4/1998 | Ayerst |
| 5,761,618 A | 6/1998 | Lynch |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,802,492 A | 9/1998 | DeLorme |
| 5,806,000 A | 9/1998 | Vo |
| 5,822,700 A | 10/1998 | Hult |
| 5,828,740 A | 10/1998 | Khuc |
| 5,920,821 A | 7/1999 | Seazholtz |
| 5,930,701 A | 7/1999 | Skog |
| 5,943,399 A | 8/1999 | Bannister |
| 5,946,629 A | 8/1999 | Sawyer |
| 5,946,630 A | 8/1999 | Willars |
| 5,950,130 A | 9/1999 | Coursey |
| 5,953,398 A | 9/1999 | Hill |
| 5,963,866 A | 10/1999 | Palamara |
| 5,966,663 A | 10/1999 | Gleason |
| 5,974,054 A | 10/1999 | Couts |
| 5,978,685 A | 11/1999 | Laiho |
| 5,987,323 A | 11/1999 | Huotari |
| 5,998,111 A | 12/1999 | Abe |
| 6,011,976 A | 1/2000 | Michaels |
| 6,014,429 A | 1/2000 | La Porta |
| 6,035,025 A | 3/2000 | Hanson |
| 6,049,710 A | 4/2000 | Nilsson |
| 6,055,413 A | 4/2000 | Morse |
| 6,055,442 A | 4/2000 | Dietrich |
| 6,058,300 A | 5/2000 | Hanson |
| 6,064,875 A | 5/2000 | Morgan |
| 6,070,067 A | 5/2000 | Nguyen |
| 6,075,982 A | 6/2000 | Donovan |
| 6,081,508 A | 6/2000 | West |
| 6,085,099 A | 7/2000 | Ritter |
| 6,087,956 A | 7/2000 | Helferich |
| 6,101,378 A | 8/2000 | Barabash |
| 6,122,503 A | 9/2000 | Daly |
| 6,122,520 A | 9/2000 | Want |
| 6,125,281 A | 9/2000 | Wells |
| 6,128,482 A | 10/2000 | Nixon |
| 6,148,197 A | 11/2000 | Bridges |
| 6,148,198 A | 11/2000 | Anderson |
| 6,149,353 A | 11/2000 | Nilsson |
| 6,169,891 B1 | 1/2001 | Gorham |
| 6,173,181 B1 | 1/2001 | Losh |
| 6,181,935 B1 | 1/2001 | Gossman |
| 6,188,752 B1 | 2/2001 | Lesley |
| 6,188,911 B1 | 2/2001 | Wallentin |
| 6,198,431 B1 | 3/2001 | Gibson |

(56) References Cited

U.S. PATENT DOCUMENTS

| | | |
|---|---|---|
| 6,199,045 B1 | 3/2001 | Giniger |
| 6,205,330 B1 | 3/2001 | Winbladh |
| 6,208,854 B1 | 3/2001 | Roberts |
| 6,208,870 B1 | 3/2001 | Lorello |
| 6,223,046 B1 | 4/2001 | Hamill-Keays |
| 6,226,529 B1 | 5/2001 | Bruno |
| 6,249,680 B1 | 6/2001 | Wax |
| 6,249,744 B1 | 6/2001 | Morita |
| 6,263,212 B1 | 7/2001 | Ross |
| 6,266,614 B1 | 7/2001 | Alumbaugh |
| 6,289,373 B1 | 9/2001 | Dezonno |
| 6,292,669 B1 | 9/2001 | Meuronen |
| 6,317,594 B1 | 11/2001 | Gossman |
| 6,327,479 B1 | 12/2001 | Mikkola |
| 6,529,722 B1 * | 3/2003 | Heinrich et al. ............ 455/404.1 |
| 6,744,854 B2 | 6/2004 | Berrier |
| 6,744,858 B1 | 6/2004 | Ryan |
| 6,751,463 B1 | 6/2004 | Lorello |
| 6,771,742 B2 | 8/2004 | Mathis |
| 6,771,946 B1 | 8/2004 | Oyaski |
| 6,775,356 B2 | 8/2004 | Salvucci |
| 6,888,927 B1 | 5/2005 | Cruickshank |
| 6,922,565 B2 | 7/2005 | Rhodes |
| 6,968,179 B1 | 11/2005 | DeVries |
| 7,054,659 B2 | 5/2006 | Gioscia et al. |
| 7,450,935 B1 | 11/2008 | Link |
| 7,603,148 B2 | 10/2009 | Michalak |
| 7,693,511 B2 | 4/2010 | Bottrich |
| 7,693,546 B1 | 4/2010 | Gioscia et al. |
| 8,265,326 B2 | 9/2012 | Singh |
| 8,284,980 B2 | 10/2012 | Parker |
| 2001/0021646 A1 | 9/2001 | Antonucci |
| 2002/0003345 A1 | 1/2002 | Stanley |
| 2003/0122669 A1 | 7/2003 | Filippov |
| 2003/0224840 A1 | 12/2003 | Frank |
| 2004/0072558 A1 | 4/2004 | Van Bosch |
| 2004/0132465 A1 | 7/2004 | Mattila |
| 2004/0158371 A1 | 8/2004 | Iggulden |
| 2004/0190497 A1 | 9/2004 | Knox |
| 2004/0198332 A1 | 10/2004 | Lundsgaard |
| 2004/0198386 A1 | 10/2004 | Dupray |
| 2004/0203692 A1 | 10/2004 | Schwinke |
| 2004/0203903 A1 | 10/2004 | Wilson |
| 2005/0009576 A1 | 1/2005 | Van Bosch |
| 2005/0080519 A1 | 4/2005 | Oesterling |
| 2005/0090236 A1 | 4/2005 | Schwinke |
| 2005/0107132 A1 | 5/2005 | Kamdar |
| 2005/0201357 A1 | 9/2005 | Poyhonen |
| 2005/0260994 A1 | 11/2005 | Losch |
| 2006/0007920 A1 | 1/2006 | Michel |
| 2006/0068753 A1 | 3/2006 | Karpen |
| 2006/0092023 A1 | 5/2006 | Hofbeck |
| 2006/0242307 A1 | 10/2006 | Jung |
| 2007/0281689 A1 | 12/2007 | Altman |
| 2008/0032702 A1 | 2/2008 | Cone |

OTHER PUBLICATIONS

Open Development Corp., "openMedia Cellular Prepaid," sales literature, undated.

Tecore, Inc., "Pre-Paid Cellular," sales literature, Mar. 25, 1997, pp. 1-4.

Bond, "Cellular Carriers Use Prepaid Programs to Reach Untapped Markets," Billing World, Mar. 1997, pp. 14-17.

Freedom Wireless, "The Freedom to Chose! Get Pre-Pay Cellular," sales pamphlet, undated.

MultiMedia Publishing Corp., "Prepaid Cellular and Prepaid Wireless Market Report and Forecast 1997-2002," sales literature, undated.

Nextlink, "Introducing a New Prepaid Telephone Service from NEXTLINK," sales literature, undated.

ETSI/3GPP, $3^{rd}$ Generation Partnership Project; Technical Specification Group Services and System Aspects; General Packet Radio Service (GPRS); Service description; Stage 2; (3G TS 23.060 version 3.2.1), Jan. 2000, pp. 138-142.

ETSI,3GPP, $3^{rd}$ Generation Partnership Project; Technical Specification Group Core Network; Customized Applications for Mobile network Enhanced Logic; (CAMEL) Phase 3—Stage 2 (3G TS 23.078 version 3.3.0), 12/199, pp. 300-329.

Bob Haynes, Jr., The Ever Changing Face of 911, MSAG Data Consultants, Jun. 1, 2005.

* cited by examiner

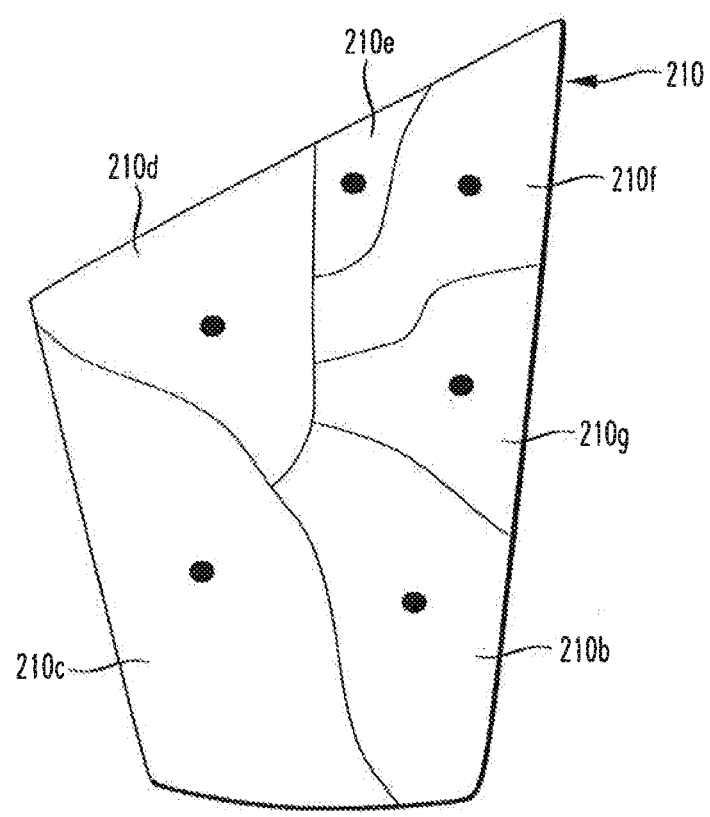

VOICE OVER INTERNET PROTOCOL (VOIP) E911 METRO STREET ADDRESS GUIDE (MSAG) VALIDATION

This application is a continuation of U.S. patent application Ser. No. 13/067,020, filed on May 3, 2011, entitled "Voice Over Internet Protocol (VoIP) E911 Metro Street Address Guide (MSAG) Validation"; which is a continuation of U.S. patent application Ser. No. 11/442,254, filed on May 30, 2006, entitled "Voice Over Internet Protocol (VoIP) E911 Metro Street Address Guide (MSAG) Validation", now U.S. Pat. No. 7,945,026; which claims priority from U.S. Provisional Patent Application No. 60/685,075, filed May 27, 2005, entitled "Voice Over Internet Protocol (VoIP) E911 Metro Street Address Guide (MSAG) Challenges", the entirety of all three of which are expressly incorporated herein by reference.

BACKGROUND OF THE INVENTION

1. Field of the Invention

This invention relates generally to wireless devices and voice over Internet Protocol (VoIP) technologies. More particularly, it relates to the provision of 911 services for VoIP users to a Public Safety Answering Point (PSAP).

2. Background of the Related Art

The E911 industry is challenged with being able to automatically deliver location information to the Public Safety Answering Points (PSAPs) for Voice Over Internet Protocol (VoIP) devices.

FIG. 3 shows a conventional E911 VoIP scenario.

In particular, as shown in FIG. 3, a VoIP carrier 100 includes a call server 202 and an Emergency Services Gateway (ESGW) 204.

A service bureau 120 includes a network location information server (LIS) 206, a Session Initiated Protocol (SIP) server (redirect) 208, and a VoIP positioning center (VPC) 210. Also included in the service bureau 120 is an Emergency Services Zone (ESZ) route database (DB) 220, and a validation database (DB) 230.

Also within the network are the Public Switched Telephone Network (PSTN) 130, a selective router 140, a Public Safety Answering Point (PSAP) 180, an Automatic Location Identification (ALI) database 190, a Master Street Address Guide (MSAG) 195, an Internet Protocol (IP) phone 150, a provisioning system 160, and a local Location Information Server (LIS) 170.

FIG. 4 shows exemplary call flow for the conventional E911 VoIP scenario shown in FIG. 3.

In particular, as shown in step 1 of FIG. 4, a caller on the IP phone 150 dials 9-1-1; and the call proceeds to the VoIP call server 202.

In step 2, the VoIP call server 202 sends a Session Initiated Protocol: uniform Resource Identifier (SIP:URI) to the SIP Server (redirect) 208.

In step 3, the SIP Server 208 queries the VoIP Positioning Center (VPC) 210 for the Emergency Services Routing Number (ESRN) and the Emergency Services Query Key (ESQK).

In step 4, the VoIP Positioning Center (VPC) 210, via the SIP Server 208, returns the ESRN & ESQK to the VoIP Carrier 100.

In step 5, the call server 202 uses the returned ESRN to route the wireless 911 call to the Emergency Services Gateway (ESGW) 204.

In step 6, the Emergency Services Gateway (ESGW) 204 routes the wireless 911 call to the selective router 140.

In step 7, the wireless 911 call is sent to the Public Safety Answering Point (PSAP) with the ESQK.

In step 8, the Public Safety Answering Point (PSAP) queries the Automatic Location Identification (ALI) database 190 using the ESQK.

In step 9, the Automatic Location Identification (ALI) database 190 queries the VoIP Positioning Center (VPC) 210 with the ESQK.

In step 10, the Service Bureau 120 matches the ESQK and returns location information.

Provision of an acceptable location for a VoIP device (particularly for a mobile VoIP device) presents a number of challenges, not the least of which is Metro Street Address Guide (MSAG) validation of a location for a VoIP E911 caller.

In particular, current Public Safety infrastructure is heavily wedded to wireline interfaces and to the notion of every E911 caller having a street address-not simply to the notion that latitude/longitude coordinates is more amenable to todays mobile phone culture. The entire conventional call scenario depicted in FIG. 4 presumes that a database record exists that identifies the location of the customer and that exists as an MSAG-validated address. In reality, this is not necessarily the case. Nevertheless, current PSAP architectures have entire response procedures built around street addresses only, and use the street address as a key to a table for looking up the appropriate emergency response. Accordingly, the bottom line is that conventional PSAPs require that location information be MSAG validated to guarantee that the PSAP database lookup will not fail.

Fundamentally, MSAG is a legacy requirement from PSAPs that did (and some still do) have "dumb" terminals that receive the call and display the address information to the call taker. In early PSAP systems, information delivery was slow and cumbersome, so the industry worked on developing a set of abbreviations that would allow an address to fit into about 20 characters.

Wireless Phase I requirements defined by NENA provide E9-1-1 for VoIP using PSAP administrative lines. Wireless Phase II requirements defined by NENA provide E9-1-1 for VoIP across traditional 9-1-1 channels. In wireless Phase II, the location of the caller is dynamically extracted from the network. This results in a latitude/longitude (lat/lon) coordinate being provided to the PSAP. Those PSAPs which have been upgraded to handle lat/lon receive the information and display it on a screen driven by a Graphical Information System (GIS), i.e., they see a map with a "caller is here" flag or dot. Such a conventional system is suitable in PSAPs which have upgraded to handle these Wireless Phase II calls (currently somewhere north of 40% of all PSAPs). However, older PSAPs still need address information, and they expect to receive an MSAG-validated address. So, for wireless, the address is given as the center of the cell site/sector which is serving the caller. Not very precise, but good enough to get emergency services in a vicinity of a wireless caller.

With Voice Over Internet Protocol (VoIP) usage, it is desirable to apply a similar model as is done in wireless. In other words, it is desirable that location information be dynamically extracted from the network, and presented to the PSAP. Unfortunately, VoIP systems, being based on the ubiquitous Internet, do not always have the luxury of a cell site/sector overlay to fall back on. In other words, a VoIP caller can make a 911 call from anywhere in the country, but there is no credible database of MSAG-validated addresses for the Internet routers to deliver the 911 call.

There is a need for a way for VoIP users to have the best of both worlds-provision of location information in latitude/ longitude (lat/lon) coordinates to a PSAP, while at the same time providing the PSAP with an MSAG validated location.

SUMMARY OF THE INVENTION

In accordance with the principles of the present invention, an overlay list of MSAG-valid addresses is created for use in lieu of (or in addition to) the lat/lon or postal address which otherwise would go with an E911 VoIP call. The invention overlays the nation with a series of MSAG-addressed polygons, with center points in those polygons identified and MSAG-valid addresses provided for those center points.

A metro street address guide (MSAG) validation database in accordance with another aspect of the present invention comprises a plurality of validated street addresses. Each of the plurality of validated street addresses is correlated with a polygon area defined by latitude/longitude coordinates.

A method of generating entries in an MSAG validation database in accordance with yet another aspect of the present invention comprises defining, in an MSAG validation database, a plurality of newly defined MSAG-addressed polygons having a greater density than a plurality of existing MSAG-addressed polygons. The plurality of existing MSAG-addressed polygons are replaced in the MSAG validation database with the plurality of newly defined MSAG-addressed polygons.

BRIEF DESCRIPTION OF THE DRAWINGS

FIG. 1B shows yet another increase in the density of MSAG-addressed polygons with respect to a single MSAG-addressed polygon shown in FIGS. 1 and 1A, to emphasize the point that the street addresses of any given polygon will continually become more and more accurate over time, as manpower and technology allows a greater density of MSAG-addressed polygons to be defined.

DETAILED DESCRIPTION OF ILLUSTRATIVE EMBODIMENTS

As VoIP wireless devices increase in numbers and usage, it is desired that VoIP calls be allowed into the PSAP E911 network using an otherwise conventional wireless interface. As technology progresses, greater numbers of communication devices are mobile. Mobile devices by definition do not have a static street address indicating their current mobile position, but rather have a lat/lon coordinate. The inventor herein recognizes that with respect to E911 requirements for locating all callers, even VoIP callers (particularly wireless VoIP callers) should be tracked by lat/lon coordinates rather than by street addresses.

The invention allows passage of a Lat/Lon coordinate to a PSAP, rather than a street address, as a current location of a VoIP user. In this way, problems associated with MSAG validation of VoIP users are avoided, and the public safety world is moved forward into the reality and growing popularity of VoIP technology.

Figure 1:
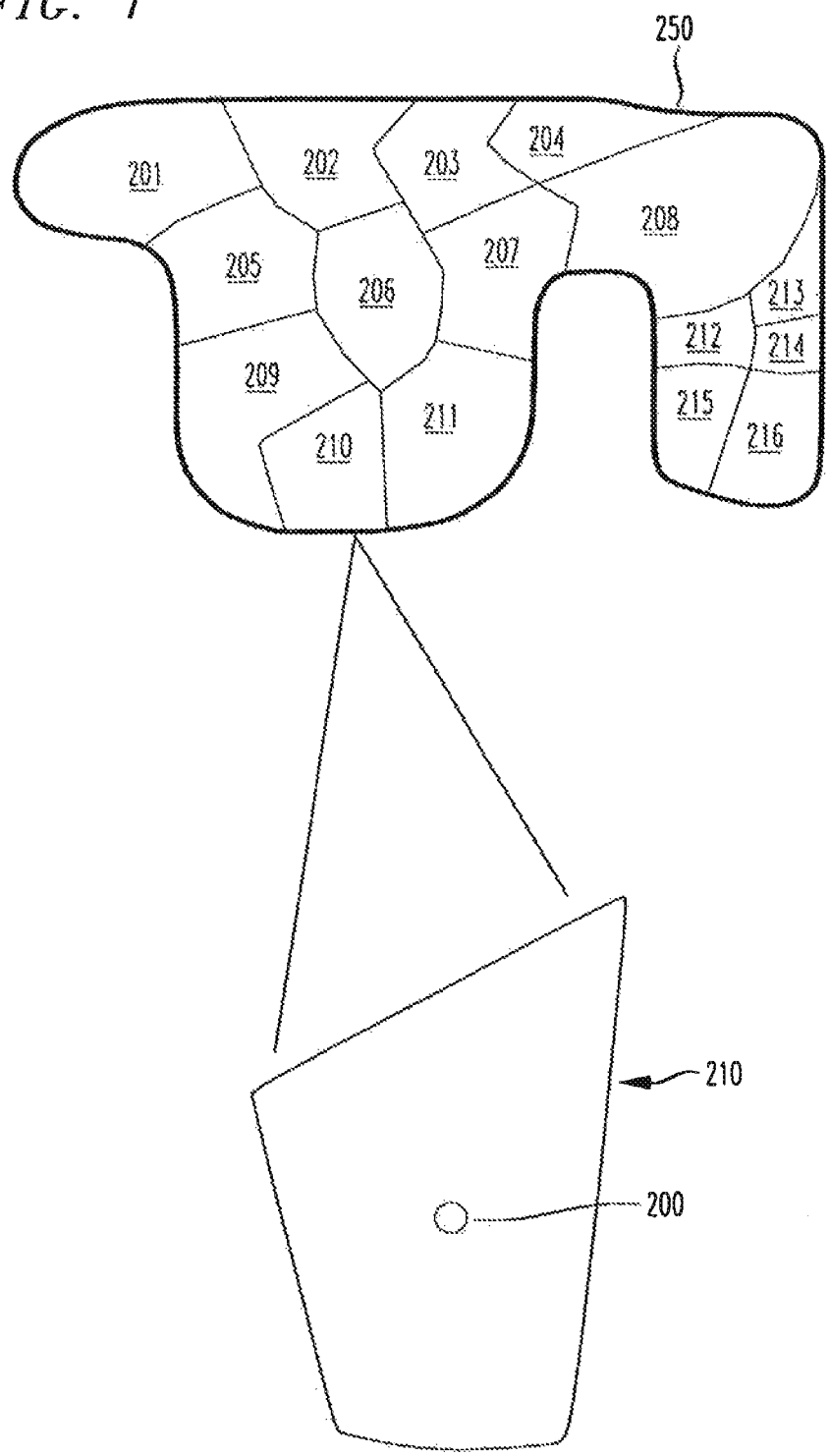
FIG. 1 depicts an exemplary state or region defined by a plurality of MSAG-addressed polygons, in accordance with the principles of the present invention.

FIG. 1 depicts an exemplary state or region defined by a plurality of MSAG-addressed polygons, in accordance with the principles of the present invention.

In particular, as shown in FIG. 1, an exemplary state 250 initially has a plurality of MSAG-addressed polygons 201-216 covering 100% of the area covered by the state (including waterways which wouldn't have a street address). As shown in the magnified view of a selected MSAG-addressed polygon 210, each MSAG-addressed polygon 201-216 has a center point (or approximate center point) 200 defined therein.

In accordance with the principles of the present invention, an overlay list of MSAG-valid addresses is created for use in lieu of (or in addition to) the lat/lon which otherwise is determined for a VoIP 911 call. The overlay list is comprised of a series of polygons that together overlay the nation, preferably with total coverage, and preferably without any overlap. Each polygon has a center point identified, and an MSAG-valid address determined. Whenever an E911 VoIP caller dials 9-1-1, their lat/lon is determined, and then the network maps the lat/lon into an appropriate one of the MSAG-addressed polygons. The MSAG-valid address for the matched polygon is provided to the responsible PSAP for that center point, preferably along with the original latitude/longitude coordinates.

When an E911 call is placed, a voice positioning center (VPC) in accordance with the principles of the present invention receives the lat/lon coordinate location information of a VoIP caller, maps it into one of the defined MSAG-addressed polygons, and then delivers the center point MSAG-valid address of the matched MSAG-addressed polygon as the MSAG-validated address of the caller. In a preferred embodiment, the latitude/longitude coordinate is also provided to the PSAP along with the MSAG-valid address for their use in mapping should they have such capability.

In this way, a similar level of coverage is provided as one gets with wireless today. Initially, the defined polygons may be defined over large areas, e.g., over existing wireless cell towers, with shapes generally conforming to the cell tower's coverage.

Figure 1A:
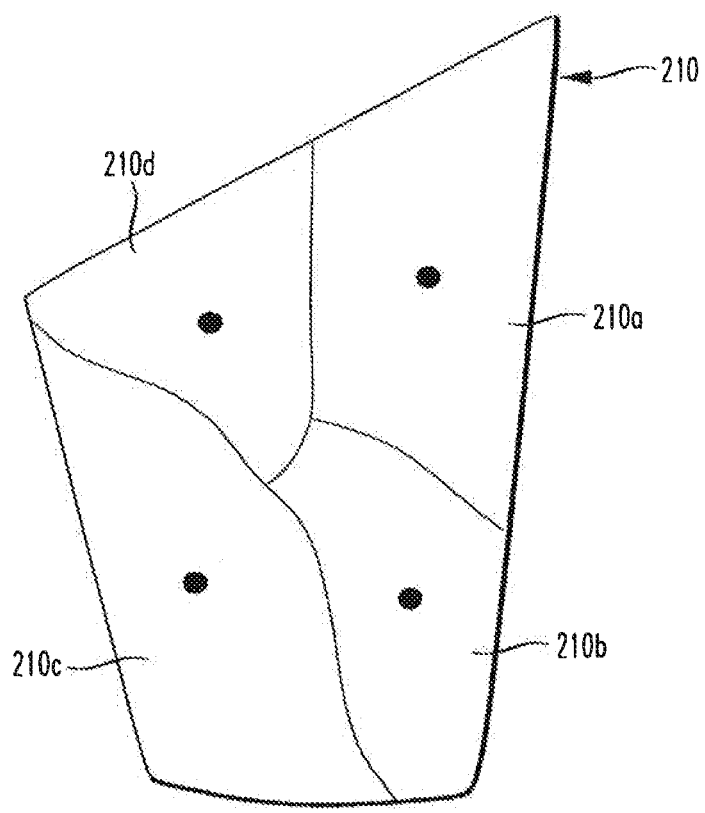
FIG. 1A shows a further increase in the density of MSAG-addressed polygons with respect to a single MSAG-addressed polygon shown in FIG. 1.

FIG. 1A shows a further increase in the density of MSAG-addressed polygons with respect to a single MSAG-addressed polygon shown in FIG. 1.

In particular, as shown in FIG. 1A, over time, the size of the polygons can be decreased (increasing the density) as a larger number of MSAG-validated addresses become available to work from. For instance, with respect to the selected MSAG-addressed polygon 210, over time it has been redefined into four new, smaller MSAG-addressed polygons 210a-210d, each having their own center points (or approximate center points) defined, and a street addressed associated therewith.

Thus, as the MSAG-addressed polygon database grows, the polygons shrink in coverage size. Eventually it is anticipated that an MSAG-valid postal address would become available for every possible position in the country, albeit some with larger accuracy (i.e., a larger MSAG-addressed polygon) than others.

FIG. 1B shows yet another increase in the density of MSAG-addressed polygons with respect to a single MSAG-addressed polygon shown in FIGS. 1 and 1A, to emphasize the point that the street addresses of any given polygon will continually become more and more accurate over time, as manpower and technology allows a greater density of MSAG-addressed polygons to be defined.

In particular, as shown in FIG. 1B, a single MSAG-addressed polygon 210a shown in FIG. 1A has later been replaced with definitions of three MSAG-addressed polygons 210e-210g, again each with an associated street address at an approximate center point respectively.

Figure 2:
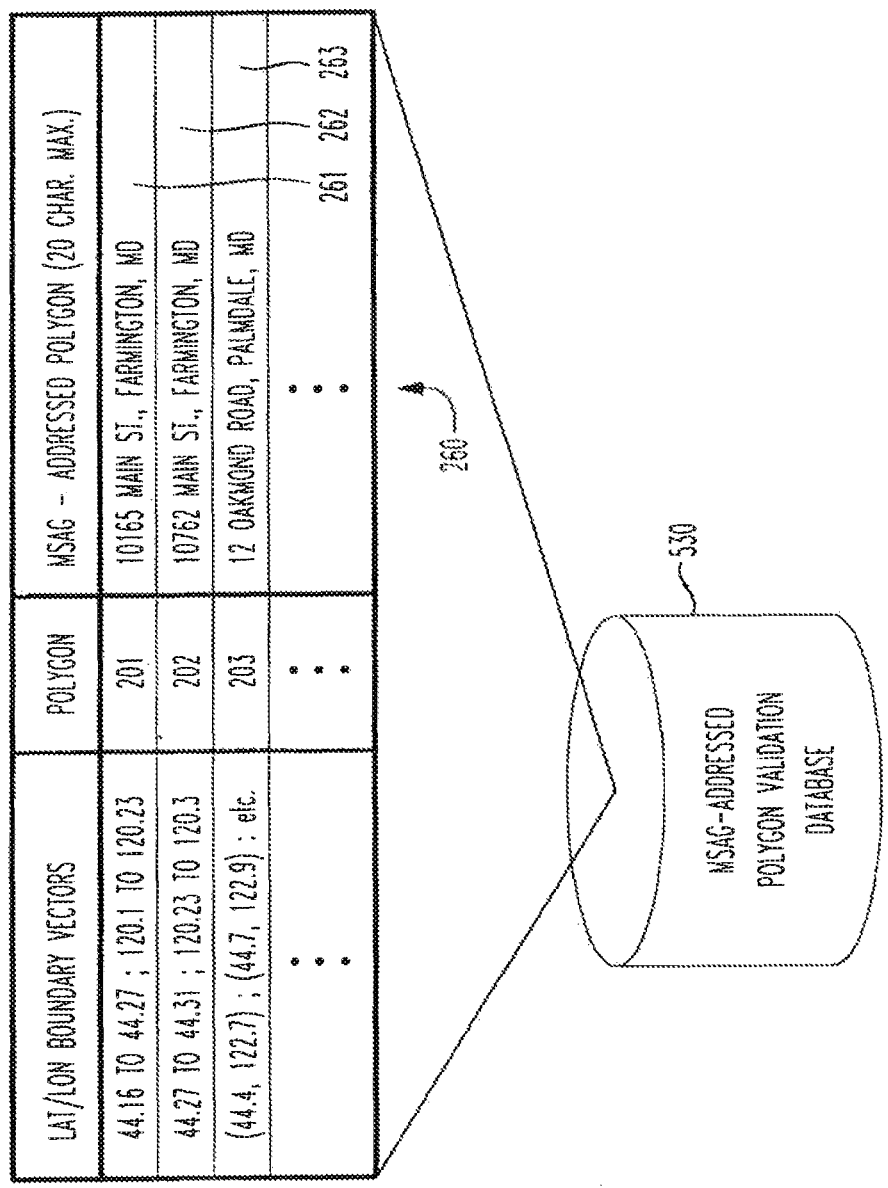
FIG. 2 shows a few exemplary entries in an MSAG-addressed polygon validation database, in accordance with the principles of the present invention.
Figure 3:
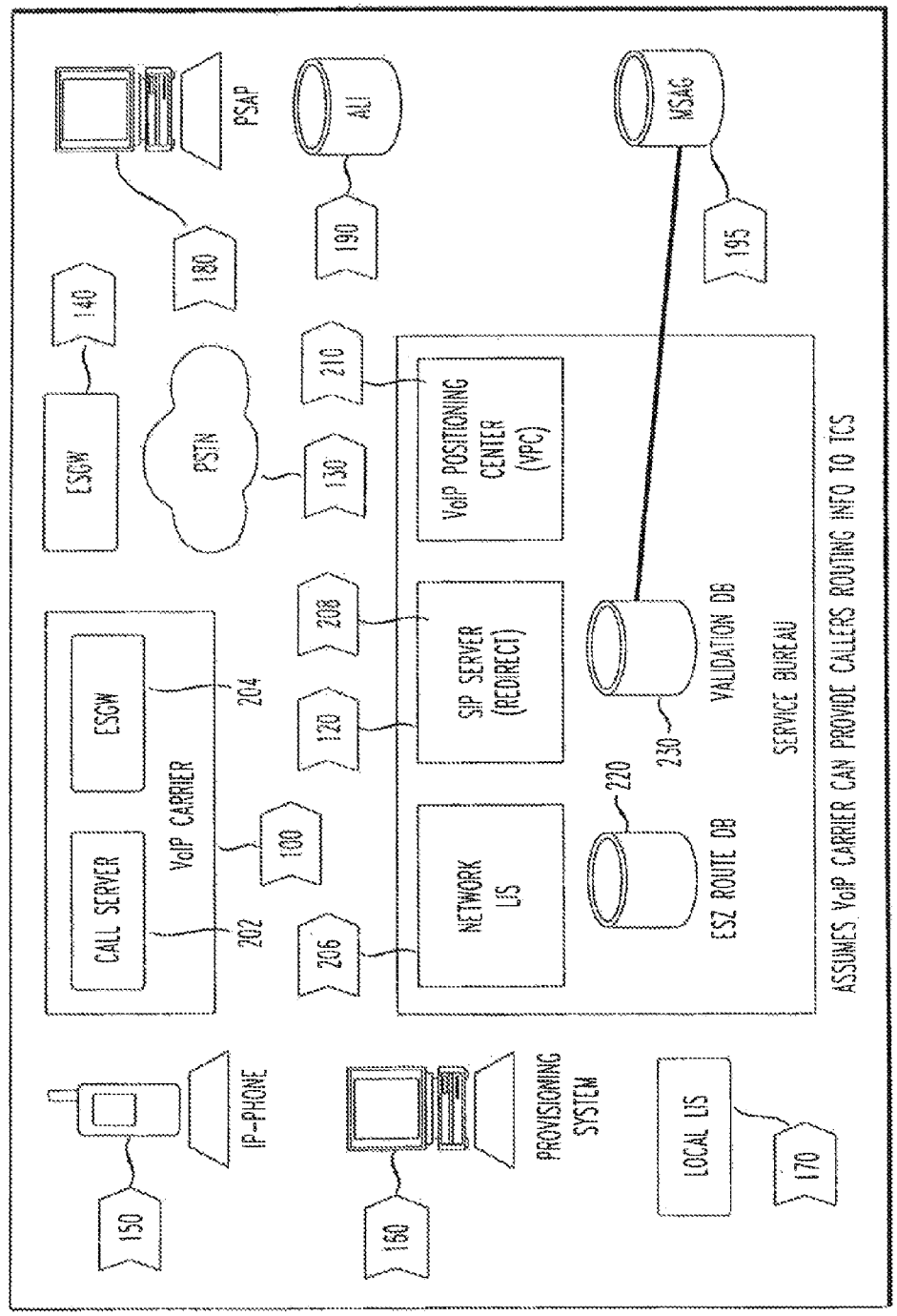
FIG. 3 shows a conventional E911 VoIP scenario.
Figure 4:
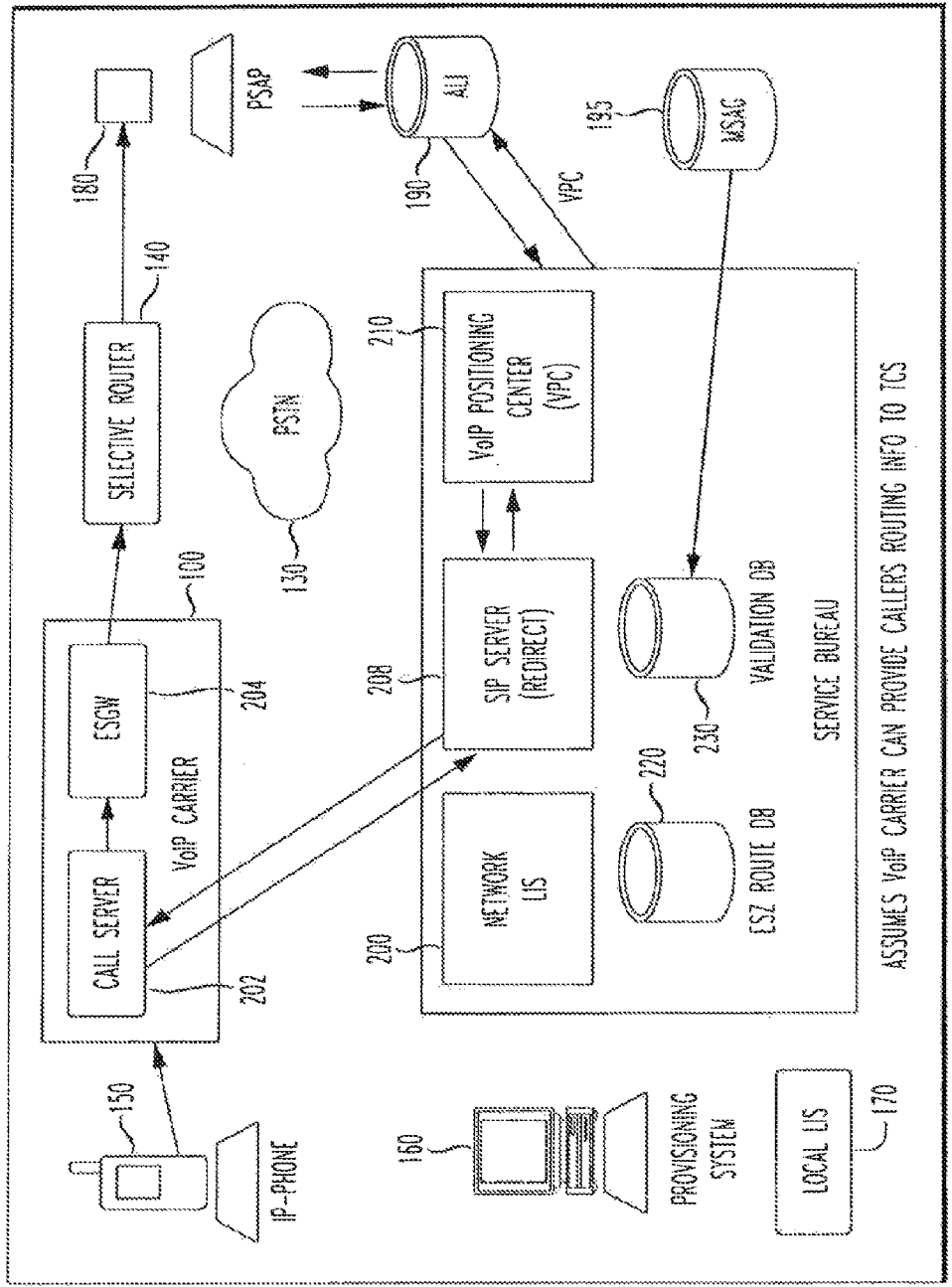
FIG. 4 shows exemplary call flow for the conventional E911 VoIP scenario shown in FIG. 3.

FIG. 2 shows a few exemplary entries in an MSAG-addressed polygon validation database 530, in accordance with the principles of the present invention.

In particular, as shown in FIG. 2, an MSAG-addressed polygon database 260 is built from MSAG-validated addresses that have precise locations and around which lat/lon polygons are created.

In entry 261, MSAG-addressed polygon 201 shown in FIG. 1 is defined by given lat/lon boundary vectors, and a center point having a street address of "10165 Main St., Farmington, Md.". It is this street address that is provided to the appropriate PSAP for any E911 VoIP caller having a current location at a time of placing the E911 call within the polygon defined by the defined lat/lon boundary vectors.

Entries 262 and 263 exemplify definitions for other MSAG-addressed polygons.

Note that the lat/lon boundary vectors may be defined in any appropriate manner, preferably by a list of lat/lon coordinates defining points along the boundary for the given MSAG-addressed polygon. Other possible definitional techniques might include other geometric shapes such as a square, circle, etc. A polygon having a virtually infinite number of coordinate points defining the boundary thereof is preferable.

Importantly, overlapping areas in the defined areas for MSAG-addressed polygons are eliminated by designation of the overlap area to one of the overlapping MSAG-addressed polygon to avoid duplicity in coverage areas by more than one MSAG-addressed polygon. While this doesn't present a problem in areas covered by a common PSAP, ambiguity would result from overlapping MSAG-addressed polygons in boundary areas of coverage between two (or more) PSAPs.

Thus, any VoIP lat/lon coordinate that falls into a given MSAG-addressed circle becomes associated with the particular street address of the center of that MSAG-addressed polygon.

The 'center' of a MSAG-addressed polygon may be determined in any appropriate manner. For instance, the center of a polygon may be determined mathematically, and a street address searched for that particular point. If no street address is known or existent for that particular center point, then a closest street address to that center point is preferably assigned to that MSAG-addressed polygon. Thus, the best of both worlds for a VoIP user is achieved, with the ability to pass a lat/lon coordinate AND an MSAG-valid street address to a PSAP.

Mapping of a lat/lon coordinate into the proper MSAG-addressed polygon, and the determination of the MSAG street address for that MSAG-addressed polygon, is preferably performed before a PSAP receives the call (e.g., by the wireless service provider). However, the PSAP may receive only the lat/lon, and perform, or request performance of, the MSAG-addressed polygon mapping, within the principles of the present invention.

Over time, the set of mappings (i.e., MSAG-addressed polygons) will become more comprehensive, allowing use as they continually improve. In particular, MSAG-addressed polygons may initially be defined simply around coverage areas of existing wireless cell towers that have a known precise lat/lon coordinate and street address. Over time more precise lat/lon coordinate associations for known MSAG-valid addresses can be collected to form a more comprehensive MSAG-addressed polygon mapping capability. As the MSAG-validated polygons become smaller and more dense, the accuracy returned to the PSAP will get better and better, allowing them to use their current wireline methods for dispatching assistance. Thus, accuracy of the street addresses of MSAG-addressed polygons will get better and better over time—allowing better and better association to a more accurate valid MSAG address, allowing Public Safety to respond appropriately to wireless E911 calls—even from wireless VoIP callers.

Though important for VoIP wireless callers, the invention has application to wireless devices in general. For instance, today's wireless world does a simple database lookup to provide the MSAG-validated street address of the wireless E911 caller as it corresponds to the address of the cell site/sector ID of the tower being used. The street address of the wireless tower used by the wireless E911 caller is identified, the street address of that tower is looked up in a table, and then an MSAG-validated street address of the tower is returned. If a PSAP only supports Phase I wireless, only the street address of a wireless E911 caller is sent as the street address of the cell-site and sector of the cell tower carrying the call. However, the present inventor realizes that a very precise (albeit unused) lat/lon positional coordinate location may be available for that wireless E911 caller. With the present invention, a more precise location can be mapped to a better MSAG-validated street address, with a better location ultimately being passed to the PSAP than merely the street address of the cell tower as in current Phase I E911 networks.

When a call is received, location information of the caller may be extracted in real time. In conventional systems this is an entered street address, but for mobile VoIP, precise location information is automatically extracted from the network. When the precise lat/lon coordinate location of the caller is obtained using any suitable method (e.g., street address input, GPS lat/lon, GPS-TV lat/lon, etc.), a GIS engine correlates the perceived location of the caller with one of the MSAG-addressed polygons.

Alternatively, the MSAG database and PSAP mapping system in accordance with the principles of the present invention may be used to construct a geographical mapping of location-oriented polygons, and association of the same with corresponding MSAG-validated addresses.

In particular, the extracted x,y (lat/lon) positional coordinate may be placed on a regional or other graphical map. The MSAG-addressed polygon that this lat/lon positional coordinate falls into is identified, and the appropriate MSAG-validated address derived and sent to the appropriate public safety answering point.

The MSAG-validated address may be passed along with the lat/lon coordinate. However, if appropriate, just the street address may be passed to the PSAP if that is all the particular PSAP desires or requires.

Thus, especially useful is application to the wireless situation where the PSAP is only Phase I (i.e., the relevant PSAP can only accept an MSAG-validated address, which it expects to be the address of the relevant cell site/sector.) In accordance with the principles of the present invention, instead of just the conventional cell site/sector address currently provided to Phase I PSAPs, a street address more closely relevant to the precise lat/lon current location coordinates of the caller can be passed to the Phase I PSAP. This is a significant improvement over Phase I E911 location reporting as it exists today.

The invention preferably also passes any kind of error information to the PSAP as well. (Phase II allows passage of a confidence factor and a correlation factor, representing some level of accuracy).

Thus, public safety is advanced a great deal by implementation of an approach that allows them to use their current response methods tied to street addresses, yet E911 wireless callers and their providers need only know the lat/lon coordinate of their current location.

While the invention has been described with reference to the exemplary embodiments thereof, those skilled in the art will be able to make various modifications to the described embodiments of the invention without departing from the true spirit and scope of the invention.

What is claimed is:

1. A method of providing location information to a requesting device, comprising:
    receiving, at a physical server, latitude/longitude information associated with a voice-over-Internet-protocol (VoIP) caller device;
    associating, at said physical server, said latitude/longitude information with a pre-defined geographic polygon enclosing said latitude/longitude from a polygon street validation database including a plurality of pre-defined geographic polygons;
    retrieving, at said physical server, a validated street address associated with a center area point of said geographic polygon; and
    routing said validated street address associated with said geographic polygon to a public safety answering point (PSAP);
    wherein said pre-defined geographic polygon is associated with a unique validated street address.

2. The method of providing location information to a requesting device according to claim 1, further comprising:
    providing said latitude/longitude information together with said validated street address to said requesting device.

3. The method of providing location information to a requesting device according to claim 1, wherein:
    said plurality of pre-defined geographic polygons do not overlap one another geographically.

4. The method of providing location information to a requesting device according to claim 1, wherein:
    a center area point of each of said plurality of pre-defined geographic polygons each have a respective validated street address associated therewith.

5. The method of providing location information to a requesting device according to claim 4, wherein:
    each of said respective validated street addresses are unique.

6. The method of providing location information to a requesting device according to claim 1, wherein:
    said geographic polygon is defined by a series of latitude/longitude coordinates.

7. The method of providing location information to a requesting device according to claim 1, wherein:
    said requesting device is a physical network server.

8. A method of providing a validated street address to a requesting device, comprising:
    receiving a request for a validated street address of a given Voice over Internet Protocol (VoIP) calling device;
    obtaining a current latitude/longitude (lat/lon) of said VoIP calling device from a physical VoIP positioning center (VPC) server;
    mapping said lat/lon of said VoIP calling device into one of a plurality of pre-defined geographic polygons maintained in a polygon street validation database;
    providing a validated street address associated with a center area point of a one of said plurality of pre-defined geographic polygons enclosing said lat/lon of said VoIP calling device;
    wherein said lat/lon of said VoIP calling device is enclosed by only one of said plurality of pre-defined geographic polygons maintained in said polygon street validation database.

9. The method of providing a validated street address to a requesting device according to claim 8, further comprising:
    providing said lat/lon of said VoIP calling device with said validated street address to said requesting device.

10. The method of providing a validated street address to a requesting device according to claim 8, wherein:
    said plurality of pre-defined geographic polygons do not overlap one another geographically.

11. The method of providing a validated street address to a requesting device according to claim 8, wherein:
    each of said plurality of pre-defined geographic polygons are associated with a unique validated street address.

12. The method of providing a validated street address to a requesting device according to claim 11, wherein:
    a center point of each of said plurality of pre-defined geographic polygons each have a respective validated street address associated therewith.

13. The method of providing a validated street address to a requesting device according to claim 12, wherein:
    each of said respective validated street addresses are unique.

14. The method of providing a validated street address to a requesting device according to claim 8, wherein:
    said geographic polygon is defined by a series of latitude/longitude coordinates.

15. The method of providing a validated street address to a requesting device according to claim 8, wherein:
    said requesting device is a physical network server.

16. The method of providing a validated street address to a requesting device according to claim 8, wherein:
    said requesting device is a public safety answering point (PSAP).

* * * * *